United States Patent
Griffiths

(10) Patent No.: US 7,137,242 B2
(45) Date of Patent: Nov. 21, 2006

(54) FUEL SYSTEM

(75) Inventor: Michael Griffiths, Bromsgrove (GB)

(73) Assignee: Goodrich Control Systems Limited (GB)

(*) Notice: Subject to any disclaimer, the term of this patent is extended or adjusted under 35 U.S.C. 154(b) by 139 days.

(21) Appl. No.: 11/020,565

(22) Filed: Dec. 22, 2004

(65) Prior Publication Data

US 2006/0130455 A1 Jun. 22, 2006

(30) Foreign Application Priority Data

Dec. 23, 2003 (GB) ................................ 0329626.6

(51) Int. Cl.
F02C 9/28 (2006.01)
(52) U.S. Cl. .................................... 60/243; 60/39.281
(58) Field of Classification Search ............. 60/39.281, 60/243, 734, 746
See application file for complete search history.

(56) References Cited

U.S. PATENT DOCUMENTS

| | | | |
|---|---|---|---|
| 4,602,479 A | 7/1986 | Hansen | |
| 5,809,771 A * | 9/1998 | Wernberg | 60/39.094 |
| 5,881,550 A * | 3/1999 | Toelle | 60/39.094 |
| 5,916,126 A | 6/1999 | Szillat et al. | |
| 2002/0095936 A1 | 7/2002 | Futa, Jr. et al. | |
| 2003/0019203 A1 | 1/2003 | Elliott | |
| 2005/0011197 A1 * | 1/2005 | Tuttle et al. | 60/39.281 |

FOREIGN PATENT DOCUMENTS

| | | |
|---|---|---|
| EP | 0 915 241 | 5/1999 |
| EP | 1 338 774 | 8/2003 |
| EP | 1 355 054 | 10/2003 |

* cited by examiner

Primary Examiner—Louis J. Casaregola
(74) Attorney, Agent, or Firm—Andrus, Sceales, Starke & Sawall, LLP

(57) ABSTRACT

A fuel control system for a staged combustion engine comprising, a fuel metering unit including a fuel metering valve having a fuel metering orifice the opening of which is varied to meter the flow of fuel through the metering valve in use, a fuel staging unit receiving fuel from the metering valve of the fuel metering unit and incorporating a staging valve for dividing the flow of fuel from the fuel metering unit to pilot burner and main burner output lines, a connection between a fuel pressure region of said fuel metering unit and a port of said staging valve, and, overthrust detection means causing said staging valve, in response to overthrust detection, to connect said port of said staging valve to low pressure, whereby to drain fuel under pressure from said pressure zone of said fuel metering unit to low pressure to limit or reduce the fuel supplied from the fuel metering unit to the fuel staging unit and thus to the engine in use.

5 Claims, 5 Drawing Sheets

FUEL SYSTEM

TECHNICAL FIELD

This invention relates to a fuel supply system for a gas turbine engine of the kind having staged combustion, particularly, but not exclusively for use in a multi-engine aircraft application.

BACKGROUND ART

In a staged combustion gas turbine engine, burners of the engine are divided into at least two groups which can, for convenience, be referred to as pilot burners and main burners. It is to be understood that the main burner group may comprise a number of main burner sub-groups, but this distinction is not of importance to the invention. Generally, while an engine is operative, fuel is supplied continuously to the pilot burners, but is supplied to the main burners only while the thrust and/or emission requirements imposed upon the engine require that the main burners are operative in addition to the pilot burners.

In the accompanying drawings FIG. 1 is a diagrammatic representation of a known arrangement of a fuel metering unit supplying metered fuel to a conventional fuel staging unit which in turn distributes the fuel to pilot burners and main burners of an engine. In FIG. 1 the fuel metering unit (FMU) 11 and the fuel staging unit (FSU) 12 are shown in broken line boundaries and output lines 13, 14 from the FSU are connected in use to the pilot burner manifold and the main burner manifold respectively of the associated gas turbine engine. Fuel from a reservoir is supplied at low pressure to the inlet of a fixed displacement pump, for example a gear pump 15, driven by the main shaft of the gas turbine engine so as to be operated, and thus produce an output, directly related to the speed of rotation of the engine shaft. The output of the pump 15 is supplied through conventional filtering into the FMU 11.

As will be well understood by those skilled in the art the following description of a conventional FMU and FSU is restricted to basic components of those units. In practice both the FMU and FSU may well incorporate additional components effecting refinements in the operation of the units.

High pressure fuel (HP) from the pump 15 is directed within the FMU 11 to the inlet of a fuel metering valve 16 which supplies metered fuel at pressure PX to the inlet of a pressure raising and shut-off valve (PRSOV) 17. The output of the PRSOV 17 is supplied through a line 18 to the FSU 12. Within the FMU 11 a pressure drop control and spill valve (PDSV) 19 senses the pressure drop across the metering valve 16 (HP-PX) and spills excess delivery flow from HP to LP in order to maintain a constant pressure drop across the metering orifice of the valve 16 as the metering orifice is opened and closed in use. The PRSOV 17 establishes a minimum fuel pressure in the FMU upstream of the PRSOV 17 below which the PRSOV 17 isolates the FMU from the FSU by preventing flow into the line 18. Furthermore, the PRSOV 17 can be operated in response to predetermined command signals to close irrespective of the fuel pressure upstream the PRSOV to isolate the FSU from the FMU and so shut-down the associated engine. FIG. 1 illustrates a normal shut-off servo valve (SOSV) 21 and a turbine overspeed shut-off servo valve (TOSSV) 22 associated with the PRSOV 17. The SOSV 21 receives shut-off signals from the conventional electronic engine control unit (EECU) (not shown) of the engine control system to cause the SOSV 21 to initiate closure of the PRSOV 17 when appropriate command signals are issued for example by the pilot. The TOSSV 22 on the other hand is usually independent of the EECU and receives its signals from a monitoring system monitoring the speed of rotation of the shaft of the engine and initiating closure of the PRSOV 17 to shut-down the engine when the monitored engine speed exceeds a predetermined safe value.

The position of the metering spool, and thus the flow number of the metering orifice, of the metering valve 16 is controlled by a metering valve servo valve (MVSV) 23 forming part of the metering valve 16 and receiving fuel demand signals from the EECU of the system and positioning the valve spool accordingly. A position sensor 24 conveniently in the form of a linear variable differential transformer (LVDT) monitors the position of the spool of the metering valve 16 and supplies spool position signals back to the EECU.

The FSU 12 receives fuel metered by the FMU 11 by way of the line 18 to the inlet of a staging valve (SV) 25. The staging valve 25 can divide the flow from the line 18 into a pilot burner flow and a main burner flow in the lines 13 and 14 respectively. The valve 25 incorporates a staging valve servo valve (SVSV) 26 and a sensor 27 in the form of an LVDT for controlling and monitoring the position of the spool of the staging valve 25 respectively. A pressure drop servo throttle valve (PDSTV) 28 is provided in the flow line 13 to the pilot burners and is open or closed to throttle the flow to the pilot burners in order to maintain a substantially constant pressure drop across the pilot burner flow orifice of the staging valve 25. The valve 25 is controlled by the EECU to divide the flow of fuel from the FMU to the FSU between the pilot burners and the main burners of the engine in a predetermined manner dependent upon the required engine operating conditions to minimise harmful emissions.

Aircraft gas turbine engines, irrespective of whether or not they have staged combustion, can experience an operating condition in which they produce more thrust than is required at that point in the operating cycle of the aircraft. A level of developed thrust in excess of the thrust commanded by the EECU is referred to as "overthrust" and can arise from a number of fault conditions, for example a fault in which the fuel metering valve is moved to a position in which it provides a fuel flow in excess of that commanded by the engine control unit in accordance with the required operating mode of the engine. When the aircraft is on the ground it is generally acceptable for an overthrust event to be terminated by the engine overspeed protection arrangement in which the excessive engine speed is detected and used to operate the TOSSV 22 to close the PRSOV 17 and thus isolate the FSU 12 and the burners from the fuel supply. Such an arrangement accommodates EECU or FMU failure resulting in excessive metering valve opening and shuts down the engine to prevent overthrust increasing to a dangerous extent.

During flight however the situation is somewhat more critical since an overthrust event in one engine of, for example, a twin engine aircraft could, if dealt with by engine shut-down, result in potentially dangerous aircraft yaw conditions. For example, consider a situation in which an aircraft is on final approach to a runway. If one of the two engines experiences an overthrust event the pilot will compensate for the yaw resulting from the overthrust, by use of the aircraft rudder. Should the engine overspeed protection system then operate to close the PRSOV 17 by means of the TOSSV 22 the overthrust will be substantially instantaneously replaced by zero thrust (and possibly engine "flameout"), at a point when the rudder setting commanded by the pilot is completely opposite to that required to compensate for engine shut down. The aircraft could thus perform a violent, and potentially dangerous yaw manoeuvre in the opposite direction. Accordingly it is considered inappropriate for there to be an overthrust control which shuts the engine down, and clearly the engine speed must not be allowed to increase to a level at which the engine overspeed control will initiate engine shut-down.

Our co-pending United States Patent Application 2003/0019203 A1 discloses a fuel system for a non-staged combustion gas turbine engine in which an additional torque motor operated valve is incorporated into the fuel system, in association with the metering valve, to modify the operation of the metering valve in the event of detection, by the EECU, of an overthrust event.

The provision of overthrust protection in the fuel supply system of a staged combustion engine would necessitate the incorporation of a number of additional control components, and it is an object of the present invention to provide a fuel system for a staged combustion engine in which no additional control valve components are used.

DISCLOSURE OF INVENTION

In accordance with the present invention there is provided a fuel control system for a staged combustion engine comprising a fuel metering unit including a fuel metering valve, a fuel staging unit receiving fuel from the metering valve of the fuel metering unit and incorporating a staging valve for dividing the flow of fuel from the fuel metering unit to pilot burner and main burner output lines, a connection between a fuel pressure region of said fuel metering unit and a port of said staging valve, said staging valve being arranged in response to overthrust detection, to connect said port to low pressure, to drain fuel under pressure from said pressure zone of said fuel metering unit to low pressure to limit or reduce the fuel supplied from the fuel metering unit to the fuel staging unit and thus to the engine.

Conveniently said pressure zone of said fuel metering unit is a servo pressure chamber of the metering valve of the fuel metering unit whereby, in response to detection of an overthrust condition of the engine said servo pressure chamber of the metering valve is connected by way of the staging valve to low pressure to limit opening of the metering valve, so limiting the flow of fuel to the fuel staging unit and thus to the engine.

Alternatively said pressure zone of the fuel metering unit is the high pressure fuel supply line to the metering orifice of the metering valve whereby, in an overthrust situation, a proportion of the fuel supplied to the fuel metering unit is diverted, upstream of the metering orifice of the metering valve, to low pressure by way of the staging valve of the fuel staging unit, to reduce the amount of fuel supplied by the fuel metering unit to the fuel staging unit and thus to the engine.

As a further alternative said pressure zone of said fuel metering unit is the fuel supply line to the staging valve of the fuel staging unit, downstream of the metering orifice of the metering valve of the fuel metering unit, whereby in an overthrust situation a proportion of the fuel metered by the metering valve of the fuel metering unit is diverted to low pressure through the staging valve, thereby reducing the amount of fuel flowing through the staging valve to the engine.

Preferably said pressure zone is the fuel supply line downstream of the metering orifice of the metering valve and upstream of an associated pressure raising and shut-off valve of the fuel metering unit through which fuel flows from the metering valve to the fuel staging unit.

BRIEF DESCRIPTION OF THE DRAWINGS

In the accompanying drawings:

FIGS. 2(A) and 2(B), is a diagrammatic representation of a fuel system in accordance with a first example of the present invention, for use with a staged combustion gas turbine engine;

PREFERRED MODES OF CARRYING OUT THE INVENTION

Figure 1:
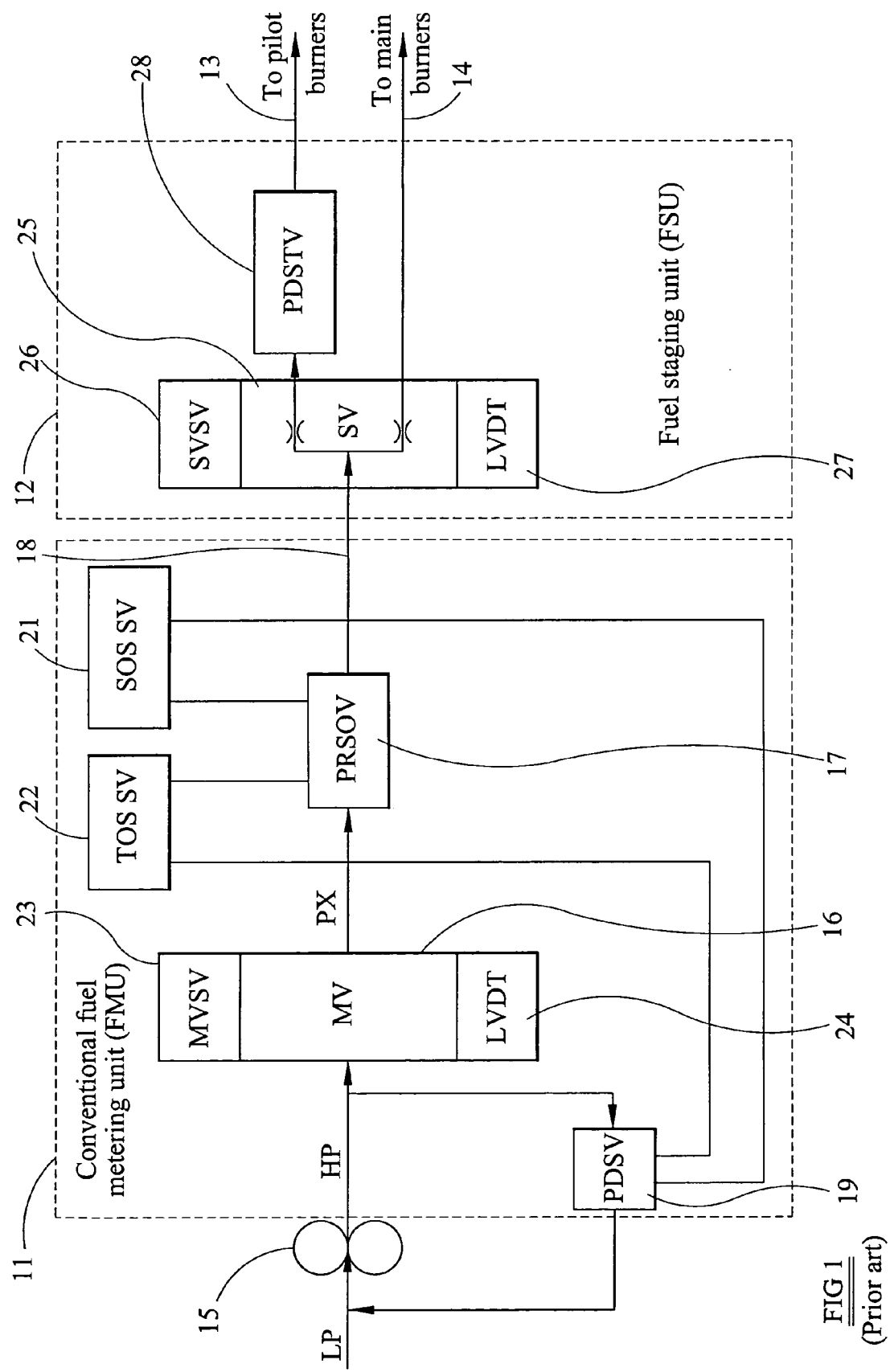
FIG. 1 is a diagrammatic representation of a known fuel system of a staged combustion gas turbine engine.
Figure 2:
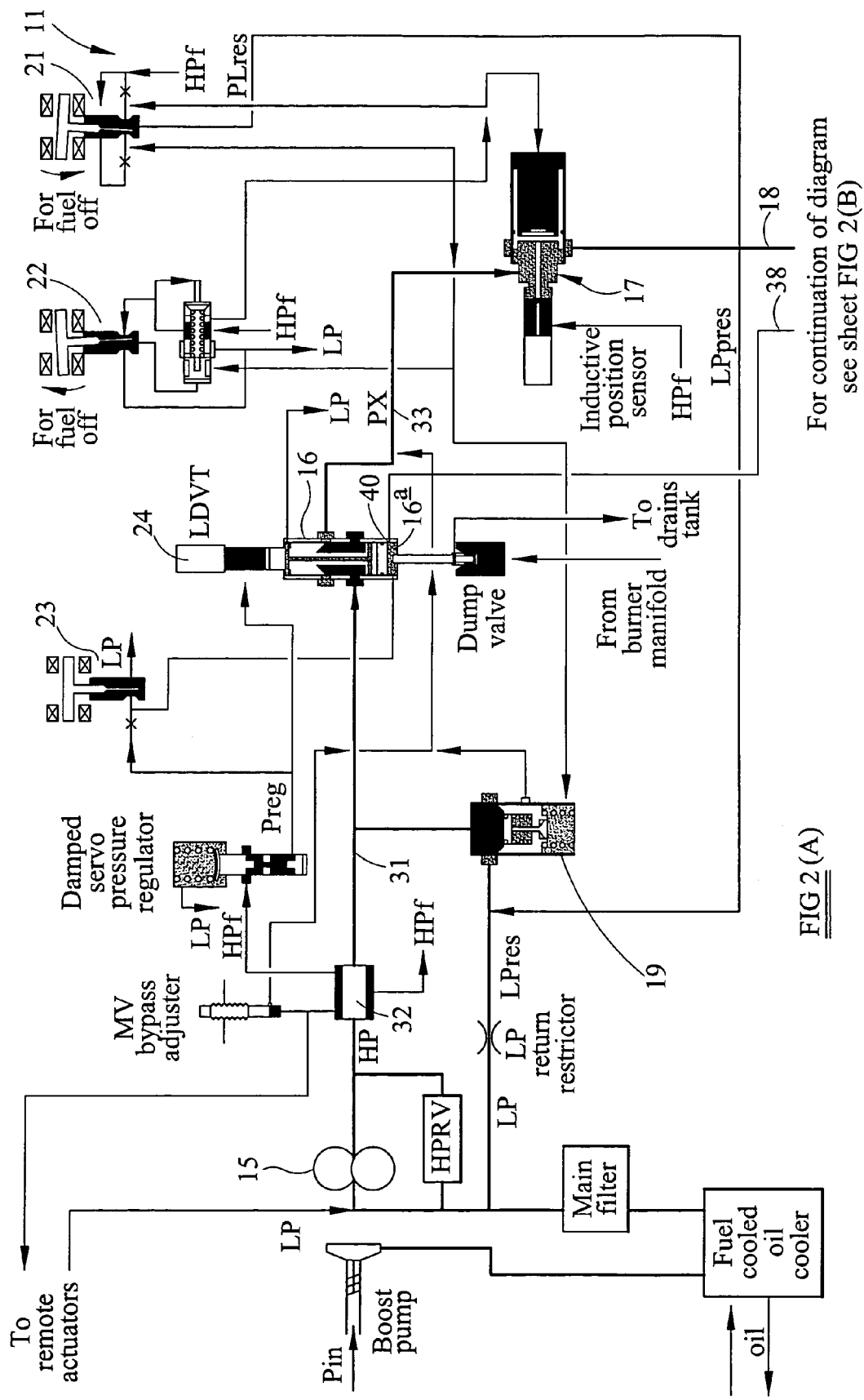
FIG. 2, shown for convenience divided into
Figure 2B:
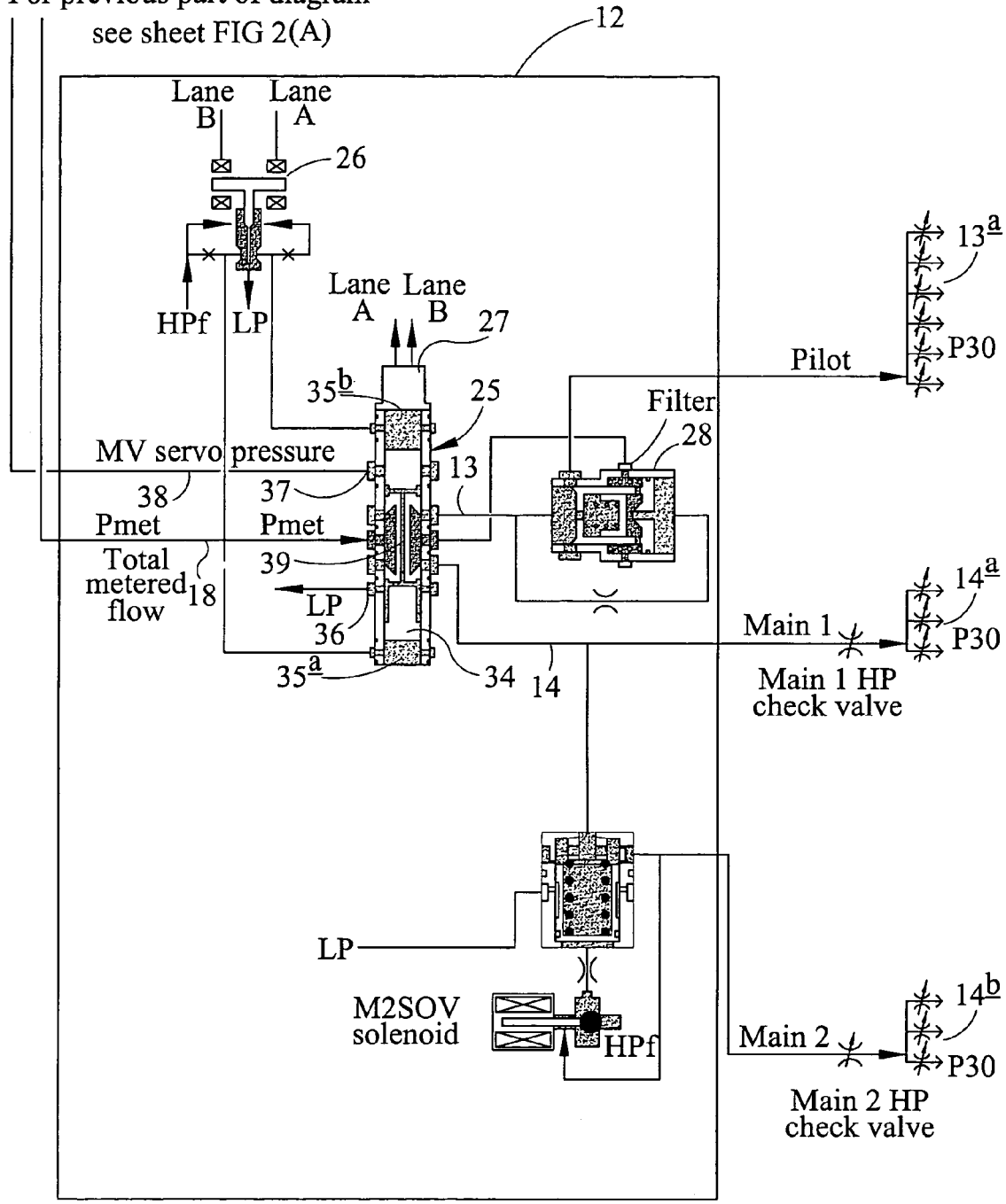

Referring first to FIG. 2 of the accompanying drawings the fuel system includes a fuel metering unit generally indicated at 11 (FIG. 2(A)), and a fuel staging unit shown in a solid line boundary and indicated by the reference numeral 12 (FIG. 2(B)). The fuel metering unit 11 is generally of conventional form and receives a supply of fuel at high pressure (HP) from a gear pump 15 driven from the main shaft of the associated gas turbine engine. The inlet of the pump 15 is supplied in conventional manner from a fuel reservoir by means of a boost pump or lift pump and the pressure at the inlet of the gear pump is defined as low pressure (LP) and which may be, in practice, above atmospheric pressure but substantially below HP. A supply line 31 from the outlet of the pump 15 contains a fuel filter 32 and provides an HP supply to the inlet gallery of a metering valve 16 and thus to the variable metering orifice of the valve 16. As is conventional in metering valves a spool of the valve is moved within the housing of the valve to control the degree of opening of the metering orifice of the valve and thus the metering of fuel flow through the valve. An output line 33 from the metering valve 16 conducts metered fuel from the metering orifice at pressure PX from the valve 16 through a pressure raising and shut-off valve 17 to an output line 18.

The PRSOV 17 operates in known manner to maintain the pressure in the metering unit, upstream the PRSOV 17, above a predetermined minimum value sufficient to operate ancillary equipment of the engine. Furthermore, the PRSOV 17 can be operated to disconnect the metering valve 16 from the line 18 when the pressure upstream the PRSOV 17 is above its predetermined value, in response to engine shut-down requirements. Thus there is provided a conventional torque motor operated shut-off servo valve 21 which, under the control of the electronic engine control unit (EECU) will cause the PRSOV 17 to close in response to a pilot initiated or safety system initiated engine shut-down command. Additionally, a torque motor operated turbine overspeed servo valve 22 is provided to shut-down the engine by closing the PRSOV 17 independently of the EECU in the event that a dangerous engine overspeed event is recognised by an overspeed protection system independent of the EECU.

A pressure drop control and spill valve 19 is responsive to the pressure drop across the metering orifice of the metering valve 16 and opens and closes to spill more or less of the HP fuel from the line 31 back to the LP side of the pump as appropriate to maintain a substantially constant pressure drop across the metering orifice of the valve 16 as the metering orifice is varied to supply more or less fuel. The valve 16 is provided with an LVDT 24 which monitors the position of the metering spool of the valve 16 and provides feed-back signals to the EECU representative of spool position. The spool can be moved to control the amount of fuel supplied through the line 33 and line 18 by varying the fuel flow into a servo pressure chamber 16a of the valve 16, the flow into in the chamber 16 being controlled by a torque motor operated metering valve servo valve 23 under the control of the EECU. Other components of the FMU 11 are depicted in FIG. 2(A), but are not described herein as they will be well understood by the skilled man, and are not of relevance to an understanding of the present invention.

The fuel staging unit 12 includes a fuel staging valve 25 having an axially movable internal metering spool 34 controlling the fuel flow through the valve 25 from the line 18 to the pilot burner supply line 13 and the main burner supply line 14. The position of the spool 34 within the housing of the valve 25 determines the split of fuel supplied through the line 18 to the lines 13 and 14 respectively. In FIG. 2(B) it can be seen that the line 14 can actually supply two sub-sets of main burners 14a and 14b while the line 13 supplies pilot burners 13a by way of the pressure drop servo throttle valve 28. The presence of two sub-sets of main burners 14a, 14b with an associated control arrangement is not of relevance to the present invention and it can, for the purposes of understanding the invention, be assumed that the line 14 supplies a single main burner manifold. As mentioned previously the function of the PDSTV 28 is to throttle the flow of fuel along the line 13 to the burners 13a in order to preserve a substantially constant pressure drop across the pilot orifice of the valve 25 between the line 18 and the line 13.

The staging valve 25 incorporates an LVDT 27 which monitors the position of the spool 34 and supplies spool position information to the EECU of the engine. The total flow to the engine is known from the position of the spool of the metering valve 16. The pilot flow is known from the position of the spool of the staging valve 25. Thus it is possible to control pilot/main split of the fuel delivered to the staging valve. The spool 34 is movable by varying the fuel flows into and out of the upper and lower servo pressure chambers 35a, 35b of the valve 25, the flow to the chambers 35 being controlled by the EECU through the intermediary of a torque motor operated staging valve servo valve 26. In normal operation therefore the setting of the valve 26 controls the flows into the chambers 35 and thus the axial position of the spool 34 relative to the valve housing. The valve 26 therefore under the control of the EECU, controls the valve 25 to determine the split of fuel supplied along the line 18, to the lines 13 and 14.

The housing of the staging valve 25 is provided with first and second additional ports 36, 37. The port 36 is connected to LP effectively at the inlet side of the gear pump 15. The port 37 is connected through a line 38 to the servo pressure chamber 16a of the metering valve 16 by way of an overthrust port 40 of the valve 16, the opening of which is controlled by the spool of the valve 16. The spool 34 of the valve 25 has an axially elongate peripheral gallery which communicates with the port 36 throughout the whole range of movement of the spool 34 within the housing of the valve. Adjacent its opposite end the spool 34 has a second annular gallery which, in a fully raised position of the spool 34, communicates with the port 37, and thus with the servo pressure chamber 16a of the metering valve 16. The two annular galleries of the spool 34 are interconnected by radial and axial passages 39 in the spool whereby in the fully raised position of the spool the galleries and passages interconnect the ports 36 and 37 so connecting the chamber 16a of the metering valve 16 to LP.

During normal operation of the staging valve 25 the ports 36 and 37 are isolated from one another so that even though port 40 may be open there is no flow through the line 38. The valve 26 controls the balance of flows in the servo pressure chambers 35a and 35b at opposite ends of the spool 34 of the staging valve 25 and thus controls the position of the spool as described above. However, in the event that the EECU or separate detection means detects that an overthrust event is occurring in the engine it signals the valve 26 to move its flapper member fully to the left (as drawn) such that flow into the chamber 35a of the staging valve 25 displaces the spool 34 of the staging valve fully upwards closing the supply of fuel to the main burners by way of the line 14 and placing the servo chamber 16a of the metering valve 16 in communication with LP by way of the port 40, the line 38 and ports 36 and 37. Thus not only is the supply of fuel to the main burners terminated, but by virtue of connecting servo chamber 16a to LP the flow from the metering valve 16 in line 33 is reduced to limit the amount of fuel supplied by way of the staging valve 25 and the line 13 to the pilot burners 13a. The arrangement is such that the spool of the valve 16 moves in a valve closing direction by virtue of the connection of the chamber 16a to LP until a point is reached at which the spool closes the port 40 isolating the chamber 16a from the line 38 and thus from LP and halting closing movement of the metering valve 16 at a limit position in which the fuel supply to the FSU has been reduced to negate the overthurst while limiting the flow through the pilot burners to that sufficient for safe operation of the engine in, for example, a landing approach phase of operation. The main burner manifold or manifolds are conveniently provided with a check valve so that after closure of the main metering orifice of the staging valve 25 to isolate the line 14 from the line 18, the line 14 and the burner manifolds remain primed with fuel to facilitate a rapid re-light of the main burners when they are next staged.

Figure 3:
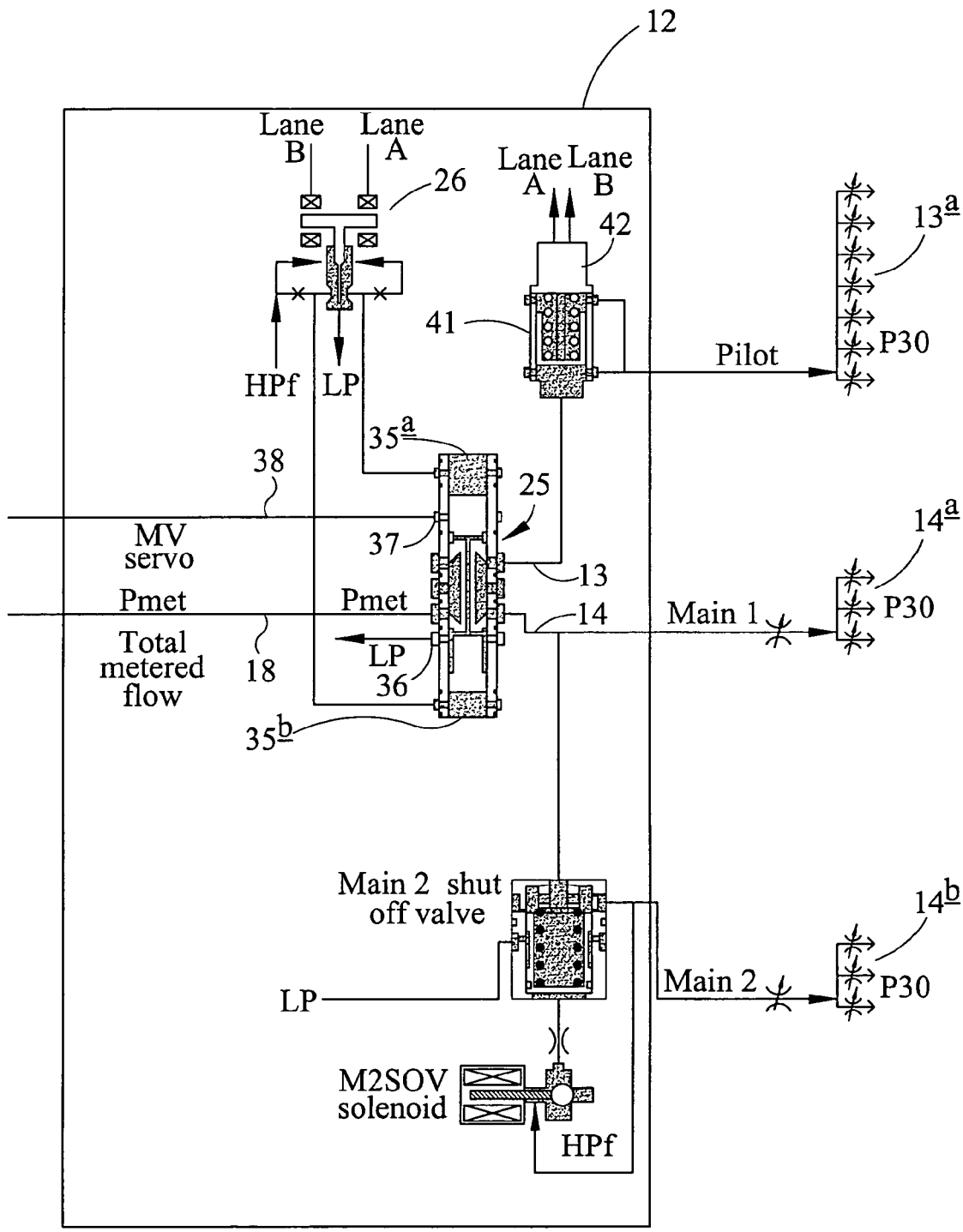
FIG. 3 is a view similar to part of FIG. 2 of a modification thereof.

FIG. 3 illustrates a modification of the arrangement shown in FIG. 2 in which the LVDT 27 of the staging valve 25 is dispensed with, and in place of the PDSTV 28 controlling the pressure drop across the pilot metering orifice of the staging valve 25, there is provided a flow sensing valve 41 equipped with a position sensor, conveniently an LVDT 42. The flow sensing valve 41 is positioned downstream of the valve 25 in the pilot burner supply line 13 and it will be recognised that the position of the movable element of the valve 41, which is exposed to the fuel pressure in the line 13, is a measure of the flow in the pilot line 13. Thus the LVDT 42 provides the EECU with a signal representative of the pilot flow, and functionally the arrangement described above with reference to FIG. 3 is identical to that described above with reference to FIG. 2, the knowledge of the fuel quantity supplied through the line 18, and the pilot flow signal derived from the LVDT 42 permitting the EECU to control the total flow to the burners and also the pilot/main split of that flow.

The systems described above with reference to FIGS. 2 and 3 provide effective control of an overthrust event caused by failure in the EECU or the FMU which results in an "upward runaway" of the metering valve 16. However, if the cause of the overthrust event is a blocked or seized PDSV 19 or a fault in the valve 16 it will be recognised that limiting the travel of the spool of the metering valve by spilling pressure from the servo pressure chamber 16a to LP, has no effect since the PDSV 19 will not react to the change in setting of the metering orifice of the valve 16.

Figure 4:
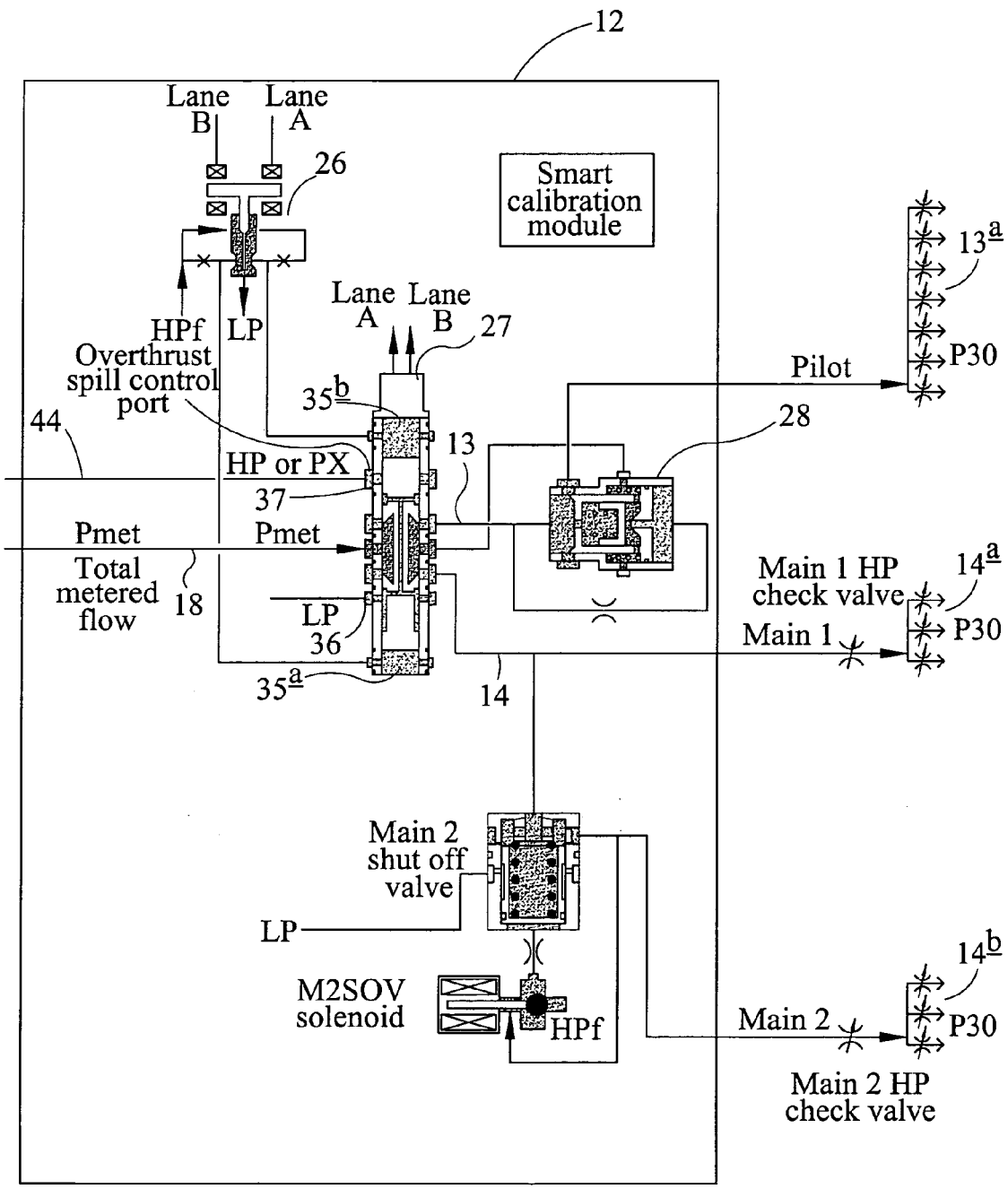
FIG. 4 is a view similar to FIG. 3 of an alternative to the constructions disclosed in FIGS. 2 and 3.

The arrangement illustrated in FIG. 4 provides a more comprehensive means of handling overthrust events in that it will accommodate a failure of the PDSV 19 as well as accommodating "upward runaway" failure of the EECU or other components of the FMU. The FSU 12 depicted in FIG. 4 has the same components as that depicted in FIG. 2 and, if desired, could be modified as described above with reference to FIG. 3. However, rather than the port 37 of the staging valve 25 being connected through a line 38 to the servo pressure chamber 16a of the metering valve 16, the port 37 is configured as a metering port and is connected through a line 44 to the line 31 of the FMU upstream of the metering orifice of the metering valve 16.

The staging valve 25 can now be used as a spill valve and can modulate fuel flow to the engine by spilling delivery flow from the FMU. This differs from the arrangement described above where the staging valve was used to control metering valve servo pressure to limit flow from the FMU to that determined by the position of the valve 16 at which port 40 was closed. In the event of an overthrust being detected by an overthrust detector arrangement separate from the EECU, the valve 26 will be operated to control the flows in chambers 35a, 35b to raise the spool of the valve 25 to uncover the port 37, which acts a variable metering spill port connecting the line 31 upstream of the metering valve 16 to LP whereby a proportion of the high pressure fuel being supplied to the metering valve 16 is in fact diverted in advance of the metering valve 16 back to LP. The overthrust detector arrangement will monitor and quantify overthrust for example by comparing actual engine speed with the engine speed required in the current operating mode and will cause the position of the spool of the valve 25 to be moved accordingly to spill more or less of the flow from the line 31 to LP, thereby effecting control, by way of the valve 25, over the engine fuelling to negate the overthrust and control engine speed independently of the FMU and EECU.

In a minor modification rather than the line 44 being connected to the line 31 it is instead connected to the line 33 downstream of the metering orifice of the valve 16. In this way it is metered flow from the valve 16 which is partially spilled back to LP, but the effect is identical to that described above where the line 44 is connected to the line 31.

The invention claimed is:

1. A fuel control system for a staged combustion engine comprising,
   a fuel metering unit including a fuel metering valve having a fuel metering orifice the opening of which is varied to meter the flow of fuel through the metering valve in use,
   a fuel staging unit receiving fuel from the metering valve of the fuel metering unit and incorporating a staging valve for dividing the flow of fuel from the fuel metering unit to pilot burner and main burner output lines,
   a connection between a fuel pressure region of said fuel metering unit and a port of said staging valve, and,
   overthrust detection means causing said staging valve, in response to overthrust detection, to connect said port of said staging valve to low pressure, whereby to drain fuel under pressure from said pressure zone of said fuel metering unit to low pressure to limit or reduce the fuel supplied from the fuel metering unit to the fuel staging unit and thus to the engine in use.

2. A fuel control system as claimed in claim 1 wherein said pressure zone of said fuel metering unit is a servo pressure chamber of the metering valve of the fuel metering unit whereby, in response to detection of an overthrust condition of the engine said servo pressure chamber of the metering valve is connected by way of the staging valve to low pressure to limit opening of the metering valve, so limiting the flow of fuel to the fuel staging unit and thus to the engine in use.

3. A fuel control system as claimed in claim 1 wherein said pressure zone of the fuel metering unit is a high pressure fuel supply line to the metering orifice of the metering valve whereby, in an overthrust situation, a proportion of the fuel supplied to the fuel metering unit is diverted, upstream of the metering orifice of the metering valve, to low pressure by way of the staging valve of the fuel staging unit, to reduce the amount of fuel supplied by the fuel metering unit to the fuel staging unit and thus to the engine in use.

4. A fuel control system as claimed in claim 1 wherein said pressure zone of said fuel metering unit is a fuel supply line to the staging valve of the fuel staging unit from the fuel metering unit, downstream of the metering orifice of the metering valve of the fuel metering unit, whereby in an overthrust situation a proportion of the fuel metered by the metering valve of the fuel metering unit is diverted to low pressure through the staging valve, thereby reducing the amount of fuel flowing through the staging valve to the engine in use.

5. A fuel control system as claimed in claim 4 wherein said pressure zone is said fuel supply line, downstream of the metering orifice of the metering valve and upstream of an associated pressure raising and shut-off valve of the fuel metering unit, through which fuel flows from the metering valve to the fuel staging unit.

* * * * *